(12) United States Patent
Goeb et al.

(10) Patent No.: US 11,171,370 B2
(45) Date of Patent: *Nov. 9, 2021

(54) AZIRIDINO-FUNCTIONAL POLYETHER THERMALLY-CONDUCTIVE GAP FILLER

(71) Applicant: 3M INNOVATIVE PROPERTIES COMPANY, St. Paul, MN (US)

(72) Inventors: Seigfried R. Goeb, Willich (DE); Simone Jurjevic, Neuss (DE); Jens Eichler, Kaarst (DE); Peter Bissinger, Diessen (DE); Wolf Steiger, Geretsried (DE)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 74 days.

This patent is subject to a terminal disclaimer.

(21) Appl. No.: 16/479,032

(22) PCT Filed: Jan. 15, 2018

(86) PCT No.: PCT/IB2018/050238
§ 371 (c)(1),
(2) Date: Jul. 18, 2019

(87) PCT Pub. No.: WO2018/134721
PCT Pub. Date: Jul. 26, 2018

(65) Prior Publication Data
US 2019/0393574 A1 Dec. 26, 2019

(30) Foreign Application Priority Data

Jan. 19, 2017 (EP) .................................. 17152180

(51) Int. Cl.
| | |
|---|---|
| *H01M 10/653* | (2014.01) |
| *H01M 10/625* | (2014.01) |
| *C08G 65/333* | (2006.01) |
| *C08K 3/04* | (2006.01) |
| *C08K 5/00* | (2006.01) |
| *C08K 5/42* | (2006.01) |
| *H01M 50/20* | (2021.01) |
| *C08K 3/02* | (2006.01) |

(52) U.S. Cl.
CPC .... *H01M 10/653* (2015.04); *C08G 65/33317* (2013.01); *C08K 3/04* (2013.01); *C08K 5/0016* (2013.01); *C08K 5/0066* (2013.01); *C08K 5/42* (2013.01); *H01M 10/625* (2015.04); *H01M 50/20* (2021.01); *C08G 2650/04* (2013.01); *C08G 2650/50* (2013.01); *C08K 2003/026* (2013.01); *C08L 2201/02* (2013.01); *C08L 2312/00* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 3,453,242 A | 7/1969 | Schmitt | |
| 4,167,618 A | 9/1979 | Schmitt | |
| 4,493,911 A * | 1/1985 | Schmitt ................... | C08K 5/20 523/109 |
| 6,894,144 B1 | 5/2005 | Zech | |
| 8,415,266 B2 | 4/2013 | Eckhardt | |
| 8,597,812 B2 | 12/2013 | Trada | |
| 2003/0087159 A1* | 5/2003 | Jung ................. | H01M 10/0565 429/303 |
| 2004/0014907 A1 | 1/2004 | Nowak | |
| 2006/0247355 A1 | 11/2006 | Kosaka | |
| 2009/0068619 A1* | 3/2009 | Klettke .................. | C08L 79/02 433/215 |
| 2010/0227945 A1 | 9/2010 | Bissinger | |
| 2011/0244299 A1 | 10/2011 | Guenner | |

FOREIGN PATENT DOCUMENTS

| | | |
|---|---|---|
| DE | 1544837 | 4/1970 |
| EP | 1337223 | 8/2003 |
| JP | 2004-022242 | 1/2004 |
| WO | WO 2002-057365 | 7/2002 |

OTHER PUBLICATIONS

Bosch, "Future Trends of Batteries" PPT, 19 pages.
Chen, "Thermal Conductivity of Polymer-Based Composites: Fundamentals and Applications", Progress in Polymer Science, Aug. 2016, vol. 59, pp. 41-85.
Grundler et.al. "Entwicklung von hochwärmeleitfähigen Polymer-Compounds" Zentrum für Brennstoffzellen Technik (ZBT) GmbH D47057 Duisburg.
Murbach, "Linear Polyurethanes from Polyalkylene Ether Glycols" Industrial and Engineering Chemistry, Sep. 1960, vol. 52, No. 09, pp. 772-775.
Pietrak, "A Review of Models for Effective Thermal Conductivity of Composite Materials", Journal of Power Technologies, 2015, vol. 95, No. 01, pp. 14-24.
Product Datasheet: "3M Fused Silica 20 and 40", A Product of: Ceradyne, Inc.—A 3M company, 2015, 2 pages.
Product Datasheet: "ACCLAIM 4200", A Product of Covestro LLC, Feb. 2016, 3 pages.
Product Datasheet: "ACCLAIM 8200 N", A Product of Covestro LLC, Apr. 2018, 3 pages.
Product Datasheet: "ACCLAIM 8200", A Product of Covestro LLC, Aug. 2012, 3 pages.

(Continued)

*Primary Examiner* — Christopher M Rodd
(74) *Attorney, Agent, or Firm* — Daniel J. Iden

(57) ABSTRACT

Thermally-conductive gap fillers are described. The gap fillers comprise an aziridino-functional polyether polymer and thermally conductive particles. Initiators suitable for such systems ae also described. Such gap fillers may be used in various applications including the manufacture of battery modules and subunits.

20 Claims, 3 Drawing Sheets

(56) References Cited

OTHER PUBLICATIONS

Saw, "Integration issues of lithium-ion battery into electric vehicles battery pack", Journal of Cleaner Production, Feb. 2016, vol. 113, pp. 1032-1045.
Vadivelu, "Polymer Composites for Thermal Management: A Review", Composite Interfaces, Apr. 2016, vol. 23, No. 09, pp. 847-872.
International Search Report for PCT International Application No. PCT/IB18/050238, dated Apr. 27, 2018, 3 pages.

* cited by examiner

US 11,171,370 B2

AZIRIDINO-FUNCTIONAL POLYETHER THERMALLY-CONDUCTIVE GAP FILLER

CROSS REFERENCE TO RELATED APPLICATIONS

This application is a national stage filing under 35 U.S.C. 371 of PCT/IB2018/050238, filed Jan. 15, 2018, which claims the benefit of EP Application No. 17152180.0, filed Jan. 19, 2017, the disclosure of which is incorporated by reference in their entirety herein.

FIELD

The present disclosure relates to compositions containing aziridino-functional polyether polymers and thermally-conductive fillers. Such compositions may be used as thermally conductive gap fillers, which may be suitable for use in electronic applications such as battery assemblies.

SUMMARY

Briefly, in one aspect, the present disclosure provides a thermally-conductive gap filler comprising an aziridino-functional polyether polymer and at least 30% by volume of a thermally-conductive filler based on the total volume of the gap filler. In some embodiments, the gap filler comprises at least 50% by volume of a thermally-conductive filler based on the total volume of the gap filler. In some embodiments, the thermally conductive filler is selected from the groups consisting of ceramics, metals, graphite, and combinations thereof.

In some embodiments, the thermally-conductive gap filler further comprises an initiator, e.g., a tosylate such as zinc tosylate. In some embodiments, the thermally-conductive gap filler further comprises at least one of a plasticizer and a flame retardant.

In another aspect, the present disclosure provides a battery module comprising a plurality of battery cells connected to a first base plate by a layer of a thermally-conductive gap filler according to any of the embodiments of the present disclosure. In some embodiments, the aziridino groups have been reacted to cure the thermally-conductive gap filler.

In yet another aspect, the present disclosure provides a battery subunit comprising a plurality of battery modules connected to a second base plate by a second layer of a second thermally-conductive gap filler, wherein each battery module comprises a plurality of battery cells connected to a first base plate by a first layer of a first thermally-conductive gap filler, wherein the first thermally-conductive gap filler and the second thermally conductive gap filler are independently selected, and each is a thermally-conductive gap filler according to any of the embodiments of the present disclosure. In some embodiments, the aziridino groups have been reacted to cure the first and second thermally-conductive gap fillers.

In a further aspect, the present disclosure provides a method of making a battery module comprising: applying a first layer of a first thermally-conductive gap filler according to any of the embodiments of the present disclosure to a first surface of a first base plate, attaching a plurality of battery cells to the first layer to connect the battery cells to the first base plate, and curing the first thermally-conducting gap filler.

In yet another aspect, the present disclosure provides a method of making a battery subunit comprising: applying a second layer of a second thermally-conductive gap filler according to any of the embodiments of the present disclosure to a first surface of a second base plate, attaching a plurality of battery modules to the second layer to connect the battery modules to the second base plate, and curing the second thermally-conducting gap filler. In some embodiments, the method further comprises making the plurality of battery modules according to any of the methods of the present disclosure.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
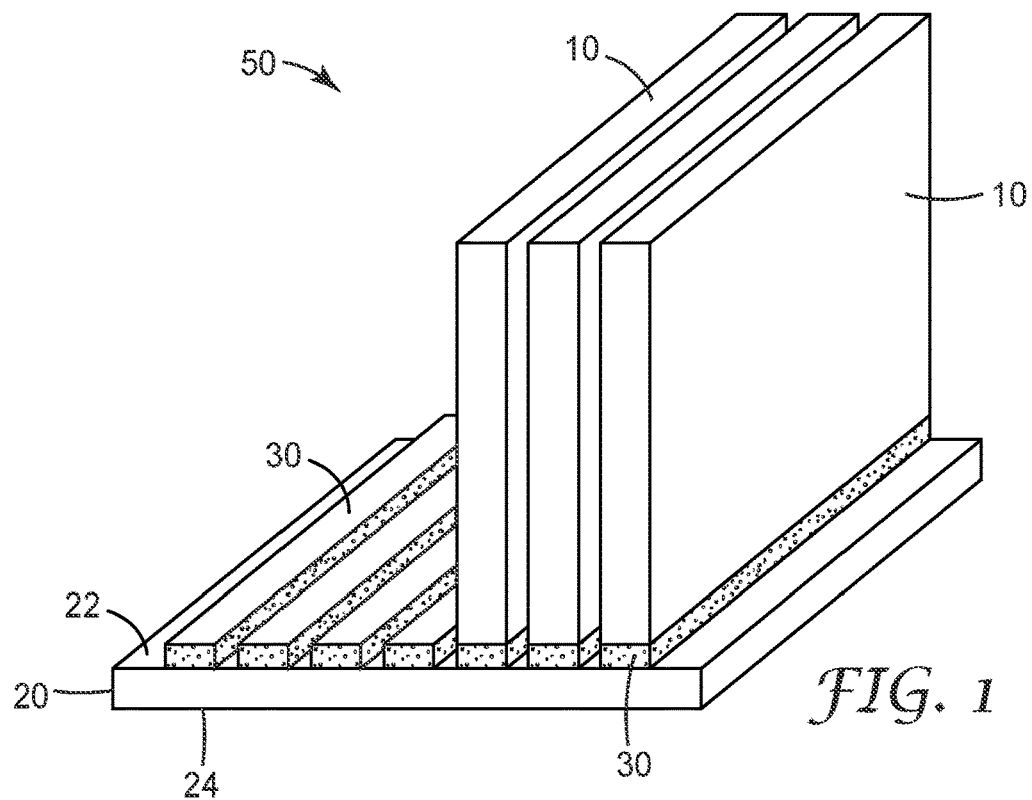
FIG. 1 illustrates the assembly of an exemplary battery module according to some embodiments of the present disclosure.

Thermal management plays an important role in many electronics applications. For example, challenges for integrating lithium-ion batteries into electric vehicle battery packs include performance, reliability and safety. Proper thermal management of battery assemblies contributes to addressing each of these challenges. This includes both first level thermal management where battery cells are assembled in a battery module, and second level thermal management where these modules are assembled into battery subunits or battery systems. Thermal management can also be important in the cooling of battery control units, as well as non-battery electronic applications.

Currently, thermal management for battery assemblies relies on curable-liquid gap fillers or pads. The curable liquids flow during assembly and can adjust to dimensional variations before being cured. Also, the liquids can be applied at the time of assembly allowing greater design flexibility. However, the current uncured and cured compositions have several limitations including the presence of contaminants, as discussed below. Pads comprise a predetermined lay-out of cured material; thus, pads have a reduced tendency to introduce contaminants. However, the cured materials may not provide sufficient conformability to accommodate the range of dimensional variations seen in typical battery assemblies. Also, design changes can be more costly and complex, as new design lay-outs must be generated.

Liquid thermal gap fillers are typically based on silicones or polyurethanes. Although silicones offer good elastomer properties for this application, they often contain non-functional polymer and volatile residuals from their production processes. Electrical contacts of the battery cell can become contaminated by silicone oil migration. Residuals of volatiles can lead to shrinkage over time. Also, even minute amounts of non-functional polymer can lead to detrimental contamination on metal surfaces inhibiting adhesion of paints or adhesives.

The most common curing mechanism for silicones that is applicable at temperatures rechargeable batteries can take and that does not release condensation byproducts is Si—H to vinyl addition cure. This reaction is based on platinum catalysis. Although the amounts of platinum used are small this remains a cost factor. Improving the speed of cure and production throughput requires the addition of more platinum and further costs. In addition, these minute amounts of catalyst can be deactivated by surface contamination leading to uncured regions and the creation of silicone contaminants. Also, the cure of silicon based materials on previously cured material of the same kind often results in a poor bond, as unreacted material displaced from the bulk acts as a separation layer. This limits the reparability of such silicone-based battery systems.

Gap fillers based on urethane chemistry can also produce very good elastomers. However, isocyanates used in such products may pose safety concerns. Also, to produce bubble-free compositions, the curing reaction should be performed in the absence of moisture, as water can react with the isocyanates leading to the formation of carbon dioxide bubbles. Gas bubbles are very detrimental to thermal conductivity and thus to be avoided. Generally, thermal gap fillers require high loadings of inorganic fillers having high surface areas. Such fillers typically come with some moisture adsorbed. Very thorough and therefore expensive drying and handling steps may be required to overcome this issue.

In view of these limitations with current approaches, there is an ongoing need for improved thermally-conductive gap fillers. In general, there is a need for systems providing one or more of the following:

sufficient open time before cure to allow components to be applied and positioned;
  rapid cure after the open time;
  easily adjustable cure profile to allow adaption to specific working cycles;
  substantially bubble-free layers to minimize reduction in thermal conductivity;
  cured compositions substantially free of unreacted components;
  compositions curable without the need for expensive catalysts such as platinum; and
  good bonding between sequentially cured layers of the same material.

Figure 2:
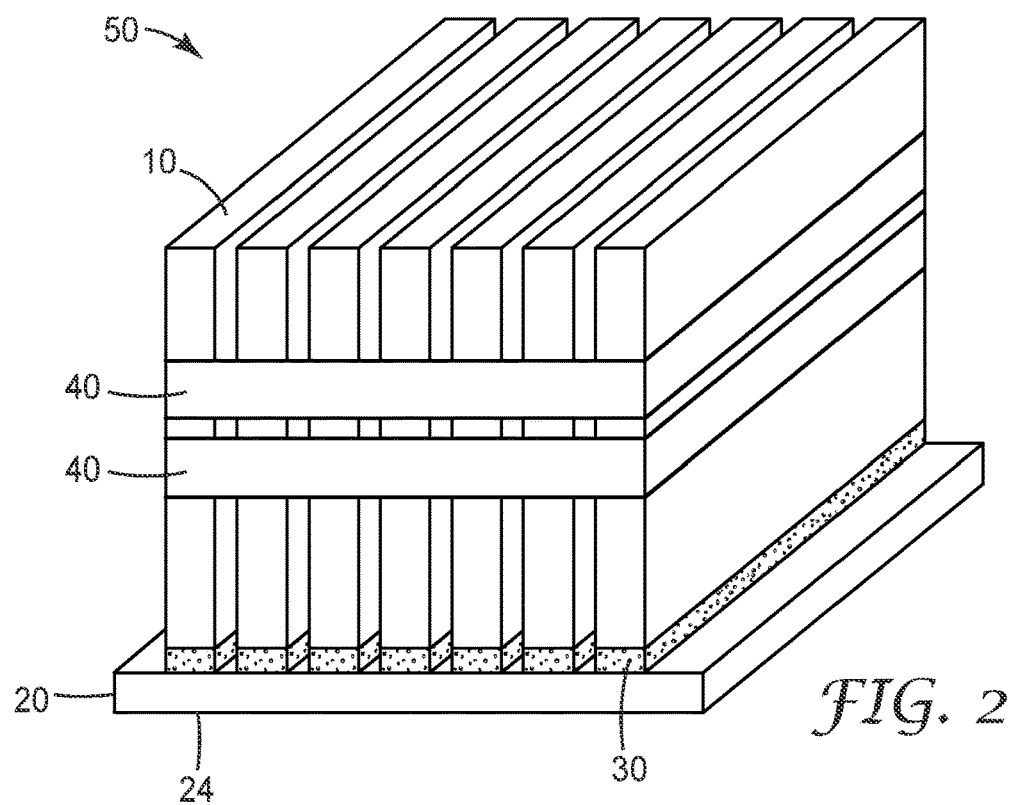
FIG. 2 illustrates the assembled battery module corresponding to FIG. 1.

Components of a representative battery module during assembly are shown in FIG. 1, and the assembled battery module is shown in FIG. 2. Battery module 50 is formed by positioning a plurality of battery cells 10 on first base plate 20. Generally, any known battery cell may be used including, e.g., hard case prismatic cells or pouch cells. The number, dimensions, and positions of the cells associated with a particular battery module may be adjusted to meet specific design and performance requirements. The constructions and designs of the base plate are well-known, and any base plate (typically metal base plates) suitable for the intended application may be used.

Battery cells 10 are connected to first base plate 20 through first layer 30 of a first thermally conductive gap filler according to any of the embodiments of the present disclosure. As described herein, such thermally conductive gap fillers comprise an aziridino-functional polyether polymer and thermally-conductive fillers.

First layer 30 of the first thermally conductive gap filler provides first level thermal management where the battery cells are assembled in a battery module. As a voltage difference (e.g., a voltage difference of up to 2.3 Volts) is possible between the battery cells and the first base plate, breakthrough voltage may be an important safety feature for this layer. Therefore, in some embodiments, electrically insulating fillers like ceramics (typically alumina and boron nitride) may be preferred for use in the first thermally conductive gap filler.

In some embodiments, layer 30 may comprise a discrete pattern of the first thermally conductive gap filler applied to first surface 22 of first base plate 20, as shown in FIG. 1. For example, a pattern of gap filler corresponding to the desired lay-out of the battery cells may be applied, e.g., robotically applied, to the surface of the base plate. In some embodiments, the first layer may be formed as a coating of the first thermally conductive gap filler covering all or substantially all of the first surface of the first base plate. In alternative embodiments, the first layer may be formed by applying the first thermally conductive gap filler directly to the battery cells and then mounting them to the first surface of the first base plate.

During the assembly step illustrated in FIG. 1, the first thermally conductive gap filler is not yet cured. This allows the individual battery cells to be positioned and repositioned as needed to achieve the desired layout. The rheological behavior of the uncured thermally conductive gap filler aides in allowing the gap filler to flow and accommodate the dimensional variations (tolerances) within and between individual battery cells.

In some embodiments, the gap filler may need to accommodate dimensional variations of up to 2 mm, up to 4 mm, or even more. Therefore, in some embodiments, the first layer of the first thermally conductive gap filler is at least 0.05 mm thick, e.g., at least 0.1 mm, or even at least 0.5 mm thick. Higher breakthrough voltages may require thicker layers depending on the electrical properties of the gap filler, e.g., in some embodiments, at least 1, at least 2, or even at least 3 mm thick. Generally, to maximize heat conduction through the gap filler and to minimize cost, the gap filler layer should be as thin as possible, while still ensure good contact with the heat sink. Therefore, in some embodiments, the first layer is no greater than 5 mm thick, e.g., no greater than 4 mm thick, or even no greater than 2 mm thick.

In some embodiments, the first thermally conductive gap filler exhibits shear thinning behavior in its uncured state. This can assist in the uniform application of the gap filler by, e.g., spray, jet, or roll coating. In particular, this rheological behavior may aide in allowing the gap filler to be applied using conventional robotic techniques. Shear thinning may also aide in easing the positioning of the individual battery cells by allowing easier movement while still holding the cells in place before final cure is achieved.

As the first thermally conductive gap filler cures, the battery cells are held more firmly in-place. When curing is complete, the battery cells are finally fixed in their desired position, as illustrated in FIG. 2. Additional elements, such as bands 40 may be used to secure the cells for transport and further handling.

Generally, it is desirable for the thermally conductive gap filler to cure at typical application conditions, e.g., without the need for elevated temperatures or actinic radiation (e.g., ultraviolet light). In some embodiments, the first thermally conductive gap filler cures at no greater than 30° C., e.g., no greater than 25° C., or even no greater than 20° C.

In some embodiments, the time to cure is no greater than 60 minutes, e.g., no greater than 40 minutes, or even no greater than 20 minutes. Although very rapid cure (e.g., less than 5 minutes or even less than 1 minute) may be suitable for some applications, in some embodiments, an open time of at least 5 minutes, e.g., at least 10 minutes, or even at least 15 minutes may be desirable to allow time for positioning and repositioning of the battery cells. Generally, it is desirable to achieve the desired cure times without the use of expensive catalysts such as platinum.

Figure 3:
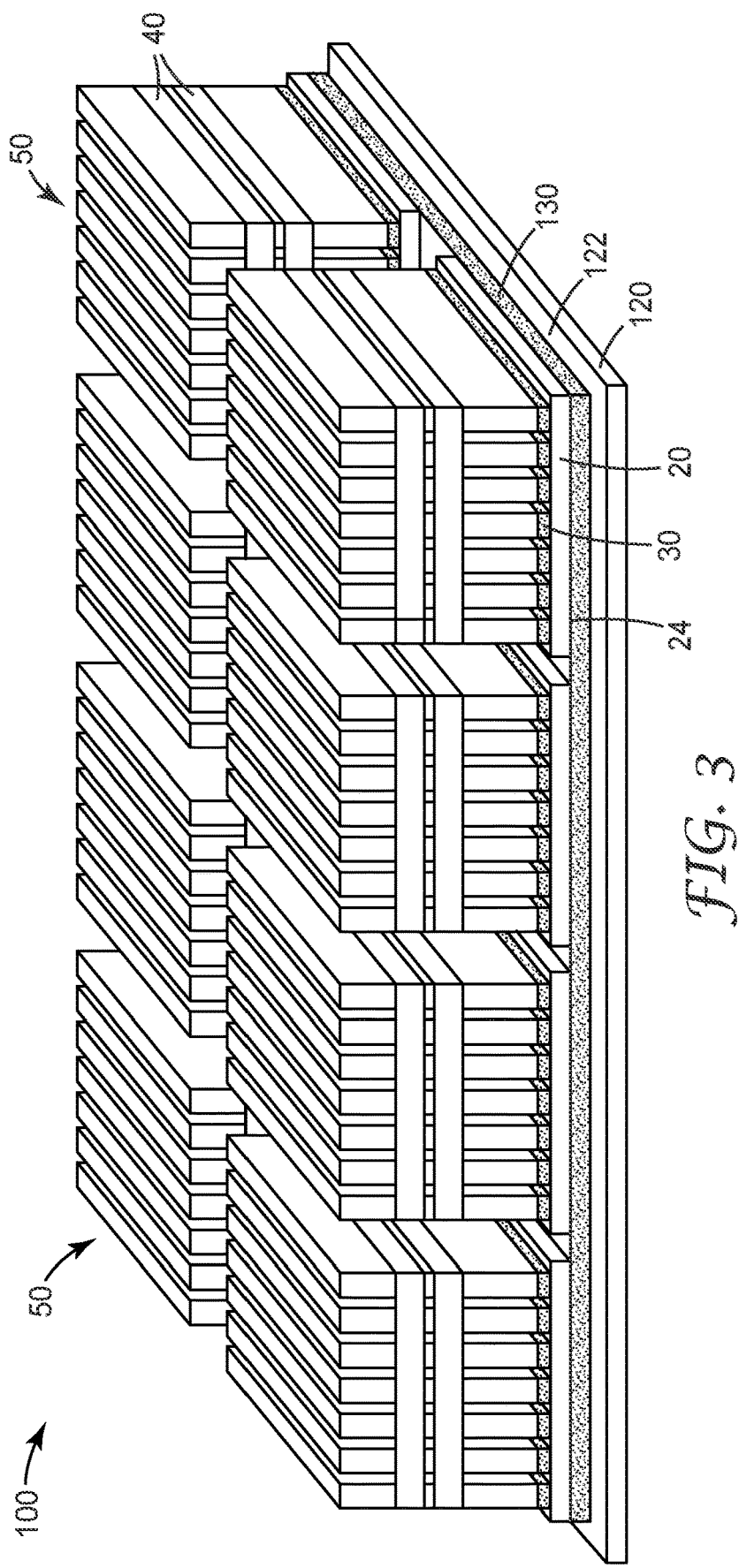
FIG. 3 illustrates the assembly of an exemplary battery subunit according to some embodiments of the present disclosure.

As shown in FIG. 3, a plurality of battery modules 50, such as those illustrated and described with respect to FIGS. 1 and 2, are assembled to form battery subunit 100. The number, dimensions, and positions of the modules associated with a particular battery subunit may be adjusted to meet specific design and performance requirements. The constructions and designs of the second base plate are well-known, and any base plate (typically metal base plates) suitable for the intended application may be used.

Individual battery modules 50 are positioned on and connected to second base plate 120 through second layer 130 of a second thermally conductive gap filler according to any of the embodiments of the present disclosure. As described herein, such thermally conductive gap fillers comprise an aziridino-functional polyether polymer and thermally-conductive fillers.

Second layer 130 of a second thermally conductive gap filler is positioned between second surface 24 of first base plate 20 (see FIGS. 1 and 2) and first surface 122 of second base plate 120. The second thermally conductive gap filler provides second level thermal management where the battery modules are assembled into battery subunits. At this level, breakthrough voltage may not be a requirement. Therefore, in some embodiments, electrically conductive fillers such as graphite and metallic fillers may be used or alone or in combinations with electrically insulating fillers like ceramics.

In some embodiments, the second layer 130 may be formed as coating of the second thermally conductive gap filler covering all or substantially all of first surface 122 of second base plate 120, as shown in FIG. 3. In some embodiments, the second layer may comprise a discrete pattern of the second thermally conductive gap filler applied to the surface of the second base plate. For example, a pattern of gap filler corresponding to the desired lay-out of the battery modules may be applied, e.g., robotically applied, to the surface of the second base plate. In alternative embodiments, the second layer may be formed by applying the second thermally conductive gap filler directly to second surface 24 of first base plate 20 (see FIGS. 1 and 2) and then mounting the modules to first surface 122 of second base plate 120.

During the assembly step the second thermally conductive gap filler is not yet cured. This allows the individual battery modules to be positioned and repositioned as needed to achieve the desired layout. As the second thermally conductive gap filler continues to cure, the battery modules are held more firmly in-place, until they are finally fixed in their desired position.

In some embodiments, the second thermally conductive gap filler exhibits shear thinning behavior in its uncured state. This can assist in the uniform application of the gap filler to the surface of the second base plate by, e.g., spray, jet, or roll coating. In particular, this rheological behavior may aide in allowing the gap filler to be applied the surface of the second base plate using conventional robotic techniques, or may aide in easing the positioning of the individual battery modules by allowing easier movement while still holding the modules in place before final cure is achieved.

Starting with a liquid, uncured thermally conductive gap filler also aides in allowing the gap filler to flow and accommodate varying dimensional variations (tolerances) within and between individual battery modules. Therefore, in some embodiments, the layer of second thermally conductive gap filler is at least 0.05 mm think, e.g., at least 0.1, or even at least 0.5 mm thick. In some embodiments, thicker layers may be required to provide the required mechanical strength, e.g., in some embodiments, at least 1, at least 2, or even at least 3 mm thick. Generally, to maximize heat conduction through the gap filler and to minimize cost, the second layer should be as thin as possible, while still ensure good contact. Therefore, in some embodiments, the second layer is no greater than 5 mm thick, e.g., no greater than 4 mm thick, or even no greater than 2 mm thick.

Generally, it is desirable for the second thermally conductive gap filler to cure at typical application conditions, i.e., without the need for elevated temperatures or actinic radiation (e.g., ultraviolet light). In some embodiments, the second thermally conductive gap filler cures at no greater than 30° C., e.g., no greater than 25° C., or even no greater than 20° C.

In some embodiments, the time to cure is no greater than 60 minutes, e.g., no greater than 40 minutes, or even no greater than 20 minutes. Although very rapid cure (e.g., less than 5 minutes or even less than 1 minute) may be suitable for some applications, in some embodiments, an open time of at least 5 minutes, e.g., at least 10 minutes, or even at least 15 minutes may be desirable to allow time for positioning and repositioning of the battery modules.

The assembled battery subunits may be combined to form further structures. For example, as is known, battery modules may be combined with other elements such as battery control units to form a battery system, e.g., battery systems used in electric vehicles. In some embodiments, additional layers of thermally conductive gap filler according to the present disclosure may be used in the assembly of such battery systems. For example, in some embodiments, thermally conductive gap filler according to the present disclosure may be used to mount and help cool the battery control unit.

In addition to the properties discussed above (e.g., cure time, open time, and rheological behavior), gap fillers provide desirable thermal and mechanical properties. For example, the thermally-conductive gap fillers provide the desired level of thermal conductivity. In the first level thermal management, a thermal conductivity of at least 1 W/mK (Watt per meter×Kelvin) may be desired, e.g., at least 1.5, at least 2, or even at least 2.5 W/mK. Even higher thermal conductivities may be desirable for the second level thermal management, e.g., at least 5 W/mk (e.g., at least 10 or even 15 W/mK).

Generally, the selection and loading levels of the thermally conductive fillers are used to control the thermal conductivity. However, the selection of the polymer, including its rheological properties, has a significant influence on the maximum achievable filler loading, and thus, the maximum achievable thermal conductivity. In some embodiments, filler loadings of at least 30% by volume (vol. %), e.g., at least 40, or even at least 50 vol. % may be needed to achieve the desired thermal conductivity.

Generally, any known thermally conductive fillers may be used, although electrically insulating fillers may be preferred where breakthrough voltage is a concern. Suitable electrically insulating, thermally conductive fillers include ceramics such as oxides, hydrates, silicates, borides, carbides, and nitrides. Suitable oxides include, e.g., silicon oxide and aluminum oxide. Suitable nitrides include, e.g., boron nitride. Suitable carbides include, e.g., silicon carbide. Other thermally conducting fillers include graphite and metals such as aluminum. Through-plane thermal conductivity is most critical in this application. Therefore, in some embodiments, generally symmetrical (e.g., spherical fillers) may be preferred, as asymmetrical fibers, flakes, or plates may tend to align in the in-plane direction.

To aide in dispersion and increase filler loading, in some embodiments, the thermally conductive fillers may be surface-treated or coated. Generally, any known surface treatments and coatings may be suitable.

The selection of the polymer used to form the thermally-conducting gap filler plays a critical role in achieving the desired end-use performance requirements. For example, the polymer plays a major role in controlling one or more of:
the rheological behavior of the uncured layer;
the temperature of cure (e.g., curing at room temperature);
time to cure profile of the gap filler (open time and cure time);
the stability of the cured product (both temperature stability and chemical resistance);
the softness and spring back (recovery on deformation) to ensure good contact under use conditions;
the wetting behavior on the base plate and battery components;
the absence of contaminants (e.g., unreacted materials, low molecular weight materials) or volatile components; and
the absence of air inclusions and gas or bubble formation.

For example, in car battery applications, the gap filler may need to provide stability in the range of −40° C. to 85° C. The gap filler may further need to provide the desired deformation and recovery (e.g., low hardness) needed to withstand charging and discharging processes, as well as travel over varying road conditions. In some embodiments, a Shore A hardness of no greater than 80, e.g., no greater than 70, or even no greater than 50 may be desired. Also, as repair and replacement may be important, in some embodiments, the polymer should permit subsequent cure and bonding of additional layers, e.g., multiple layers of the same thermally-conducting gap filler.

The present inventors have discovered that aziridino-functional polyether polymers provide a good balance of the desired properties. Generally, the polyether backbone provides both the desired uncured rheological properties as well as the desired cured mechanical and thermal properties, while allowing the necessary filler loadings to achieve adequate thermal conductivity. The aziridino functionality provides the desired cure behavior.

Polyethers are generally known and the specific choice of polyether may depend on a variety of factors including the desired thermal and mechanical properties. Polyether generally refer to polymers having ether groups in their main chain. Suitable polyethers for use in the present disclosure include aliphatic polyethers. Such polyethers include straight and branched alkylene groups connected through the ether linkages. In some embodiments, the alkylene groups have 1 to 6 carbon atoms, e.g., 2 to 4 carbon atoms.

In some embodiments, the polyether is a homopolymer having repeat units of only a single alkylene group. In some embodiments, the polyether is a copolymer of two or more alkylene groups. Such copolymers may be block copolymers, multi-block copolymers, alternating copolymers, or random copolymers. Such copolymers can show homogenous or gradient distributions of the monomers along the chain. In some embodiments, the copolymers may contain blocks of homopolymer, blocks of random copolymers, blocks of alternating copolymers, and combinations thereof.

In some embodiments, the polyether blocks may be selected from polytetrahydrofuran, polypropylene oxide, polyethylene oxide, copolymers of ethyleneoxide and tetrahydrofuran, copolymers of propylene oxide and tetrahydrofuran, copolymers of ethylene oxide and propylene oxide, block copolymers of ethylene oxide and propylene oxide and random terpolymers of ethylene oxide, propylene oxide, and tetrahydrofuran.

The polyethers may be prepared by the polymerization or copolymerization of cyclic ethers. Suitable cyclic ethers include, e.g., oxirane, alkyl-oxiranes (e.g., methyl-oxirane and ethyl-oxirane), substituted alkyl-oxiranes (e.g., chloromethyl-oxirane, hydoxymethyl-oxiranes, alkoxyalkyl-oxiranes, and phenoxyalkyl-oxiranes), oxetane, tetrahydrofurane, and substituted tetrahydrofuranes, e.g., 3-methyl-tetrahydrofurane.

A polyether prepolymer of the general formula consisting of one, two three or more different repeating units is:

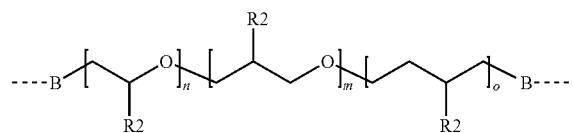

wherein: B is O or NR4;
R4 is H, a $C_1$ to $C_{12}$-Alkyl, a $C_2$ to $C_{12}$-Alkenyl, or an Aryl;
each R2 is independently selected from H, alkyl (e.g., methyl, ethyl), substituted alkyl (e.g., chloromethly, hydroxymethyl), and phenyl; and
n, m, and o are integers.

Integers m, n, and o may be independently selected and may be zero, provided that at least one is not zero, and these values are selected such that the resulting molecular weight meets the desired conditions. In some embodiments, n, m, and o are selected such that the molecular weight is at least 2000 grams per mole, e.g., at least 3000, or even at least 5000 grams per mole. In some embodiments, n, m, and o are selected such that the molecular weight is no greater than 20,000 grams per mole, e.g., no greater 15,000 grams per mole, e.g., no greater than 10,000 grams per mole. In some embodiments, n, m, and o are selected such that the molecular weight is between 2000 and 20,000 grams per mole, e.g., between 3000 and 15,000 grams per mole, between 3000 and 10,000 grams per mole, where all ranges are inclusive of the end points.

Aziridino functional (sometime referred to as aziridinyl functional) organic moieties are attached to backbones containing oxygen atoms in the main chain. In some embodiments, the aziridino functional group is of the formula:

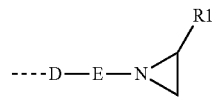

wherein: D is selected from C(=O)O, C(=O)NR5, C(=O), C(=O)C(=O)N(R5), C(=O)(CH$_2$)$_p$(C(=O), C(=S)NR5, and CH$_2$;

E is an alkylene group; and

R1 is H, a $C_1$ to $C_{12}$-Alkyl, a $C_2$ to $C_{12}$-Alkenyl, or an Aryl;

R5 is H, a $C_1$ to $C_{12}$-Alkyl, a $C_2$ to $C_{12}$-Alkenyl, or an Aryl; and p is an integer.

In some embodiments, R1 is H-, Methyl-, Ethyl-, Ethenyl-, Propenyl-, Phenyl-, or Tolyl-.

Exemplary aziridino functional groups include:

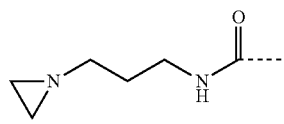

where: D=C(=O)NR5 (with R5=H); E=1,3-propandiyl;

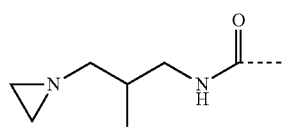

where: D=C(=O)NR5 (with R5=H); E=2-methyl-1,3-propandiyl;

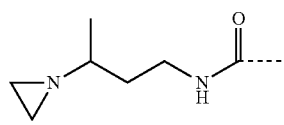

where: D=C(=O)NR5 (with R5=H); E=1,3-butandiyl;

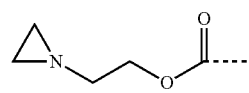

where: D=C(O)O; E=1,2-ethandiyl;

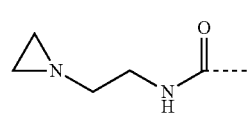

where: D=C(O)O; E=1,2-ethandiyl;

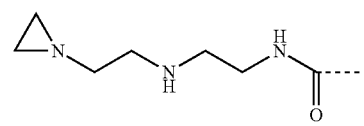

where: D=C(O)NH; E=2-aza-1,4-butandiyl;

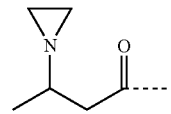

where: D=C(O); E=2-methyl-1,2-propandiyl;

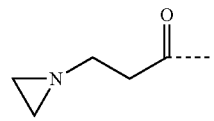

where: D=C(O); E=1,2-ethandiyl;

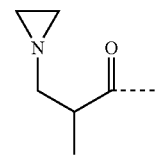

where: D=C(O); E=1-methyl-1,2-propandiyl;

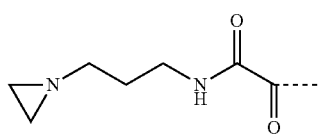

where: D=C(=O)C(=O)NR5 (with R5=H); E=1,3-propandiyl;

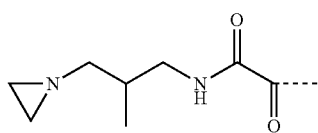

where: D=C(=O)C(=O)NR5 (with R5=H); E=2-methyl-1,3-propandiyl; and

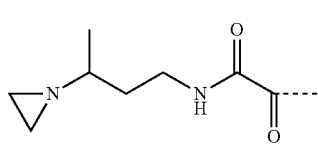

where: D=C(=O)C(=O)NR5 (with R5=H); E=1,3-butandiyl.

The aziridino groups may attached to the polyether backbone through any of a variety of divalent linking groups. For example, they may be attached through carbonate-, urethane-, urea-, ester- ether- or other linkages.

In some embodiments, the resulting aziridino-functional polyether has the general formula:

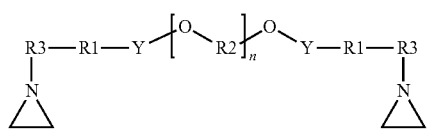

wherein: R3 is a straight chain or branched alkylene group, e.g., having 1 to 8 carbon atoms;
R1 is a covalent bond or an alkylene group;
each R2 is independently selected from the group consisting of alkylene groups;
Y is a divalent linking group;
and n is an integer selected to achieve the desired molecular weight of the polyether.

For example, in some embodiments, the resulting aziridino-functional polyether has the general formula:

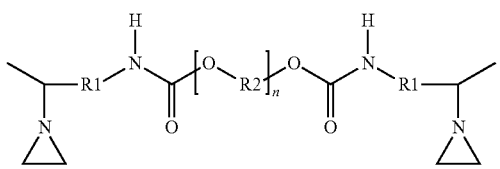

wherein: R1 is a covalent bond or an alkylene group; each R2 is independently selected from the group consisting of alkylene groups; and n is an integer selected to achieve the desired molecular weight of the polyether.

In some embodiments, n is selected such that the molecular weight is at least 2000 grams per mole, e.g., at least 3000, or even at least 5000 grams per mole. In some embodiments, n is selected such that the molecular weight is no greater than 20,000 grams per mole, e.g., no greater 15,000 grams per mole, e.g., no greater than 10,000 grams per mole. In some embodiments, n is selected such that the molecular weight is between 2000 and 20,000 grams per mole, e.g., between 3000 and 15,000 grams per mole, between 3000 and 10,000 grams per mole, where all ranges are inclusive of the end points.

In some embodiments, R1 is an alkylene group having 1 to 4 carbon atoms, e.g., 2 carbon atoms. The alkylene groups may be straight chain or branched alkylene groups.

Generally, the R2 groups may be selected independently from the R1 group. Therefore, any selection of the R2 groups may be combined with any selection of the R1 group. In some embodiments, each R2 is independently selected from the group consisting of straight chain and branched alkylene groups having 1 to 6 carbon atoms, e.g., 2 to 4 carbon atoms. In some embodiments, the R2 groups comprise alkylene groups having three carbon atoms. In some embodiments, each of the R2 groups is an alkylene groups having three carbon atoms. In some embodiments, the aziridino-functional

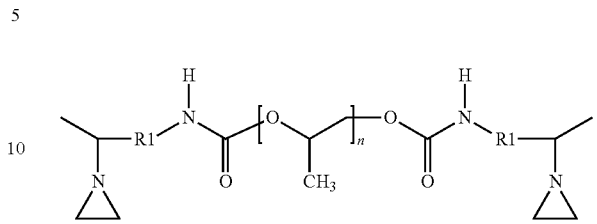

polyether has the general formula:
wherein R1 and n are as previously described. For example, in some embodiments, R1 is an alkylene group having two carbon atoms.

In some embodiments, the R2 groups are selected to produce a copolymer, e.g., a random copolymer of two or more different alkylene groups connected by the ether linkages. In some embodiments, such copolymers include both alkylene groups having two carbon atoms and alkylene groups having four carbon atoms. For example, in some embodiments, the aziridino-functional polyether has the general formula:

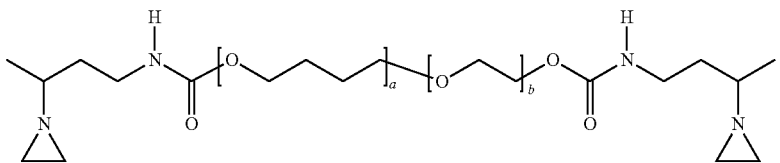

wherein: a and b are integers, and the sum of a and b equals n, which has been described herein. Although the R1 groups are show as ethylene groups, other alkylene groups may be used. It is understood that the polymer can be a block copolymer, a random copolymer or any other arrangement of repeating units.

In some embodiments, the thermally-conductive gap fillers of the present disclosure comprise a single aziridino-functional polyether. In some embodiments, two or more different aziridino-functional polyethers may be combined.

Generally, any of the thermally-conductive gap fillers of the present disclosure may include other additives. For example, in some embodiments, the gap fillers further comprise at least one of a plasticizer and a flame retardant. Generally any know plasticizer may be used. In some embodiments, polyether plasticizers may be used. Generally, any known flame retardants may be used alone or in combination.

In one aspect, it is a goal of these thermally-conductive gap fillers to provide improved flame retardancy, especially in light of the combination of aziridino-functional polyether and the chosen flame retardant materials. More specifically, in some embodiments, the present compositions seek to meet the flame retardancy requirements of the standard UL-94. In particular, many current solutions for thermally-conductive gap fillers use silicones, polyurethanes, or other chemistries that possess inherent flame retardancy. For the current compositions, however, there exists a need to balance the highest practical loading of thermally conductive fillers with the safety of meeting industry flame retardancy standards.

In some embodiments, the flame retardant additives include intumescent materials such as expandable graphite and phosphorous compounds. The flame retardant additives may also include aluminum hydroxide compounds (for instance, Aluminum trihydroxide). Furthermore, combinations of such flame retardant materials may also be used and may exhibit improved effectiveness when compared to the fillers used individually.

In some embodiments, the thermally-conductive gap filler according to the present description may comprise a flame retardant selected from the group consisting of an intumescent material, an aluminum hydroxide, and combinations thereof. Specifically, the intumescent material may be selected from the group consisting of phosphorous and expandable graphite. Furthermore, when the thermally-conductive gap filler is a phosphorous material, it may be selected from red phosphorous and white phosphorous.

In some embodiments, the thermally-conductive gap fillers of the present disclosure include an initiator. Generally, the initiator is selected to initiate the reaction of the aziridino-groups and any initiator suitable for that purpose may be used. For example, acids are known to initiate such reactions.

In some embodiments, the initiator is a tosylate, e.g., zinc toslylate having the general formula:

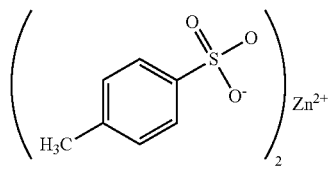

referred to herein as Zn-TOS.

In order to achieve low temperature, e.g., room temperature, cure without the need for actinic radiation, two-part systems may be preferred. In such systems, the initiator is in one part, often referred to as Part A, and the aziridino-function polyether polymer is in the second part, often referred to as Part B.

The non-reactive components may be distributed as desired between Parts A and B. In some embodiments, all of the thermally-conductive fillers are in Part B with the polyether polymer. In some embodiments, thermally-conductive fillers may be present in both Parts A and B. In some embodiments, it may be desirable to distribute the fillers such that the subsequent mixing of Parts A and B is made easier, e.g., by matching the viscosities of Parts A and B.

EXAMPLES

The following non-limiting examples illustrate various embodiments of the present disclosure.

Samples of a thermally conductive gap filler were prepared by combining an aziridino-functional polyether polymer, a thermally conductive filler, and an initiator formulation.

The first aziridino-functional polyether polymer (AZ-PE-1) corresponded to the following structure:

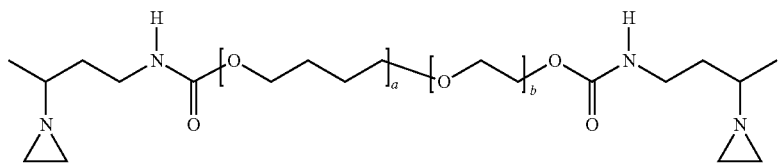

wherein: a was 73 and b was 16. The resulting molecular weight (Mn) was calculated to be 6250 Daltons. The viscosity measured at 23° C. was 26 Pa·seconds. This polymer may be obtained as PREGON aziridino-functional polyether from 3M Company.

The second aziridino-functional polyether polymer (AZ-PE-2) corresponded to the following structure:

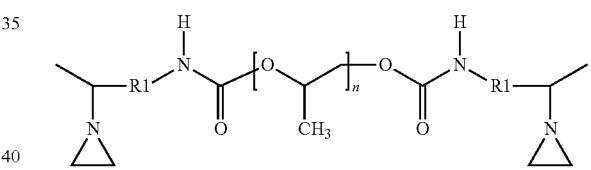

with a calculated molecular weight (Mn) of 4400 Daltons. The viscosity measured at 23° C. was 2.2 Pa·seconds. This polymer may be obtained as A-PREGON-4 aziridino-functional polyether from 3M Company.

The third aziridino-functional polyether polymer (AZ-PE-3) corresponded to the following structure:

with a calculated molecular weight (Mn) of 8400 Daltons. The viscosity measured at 23

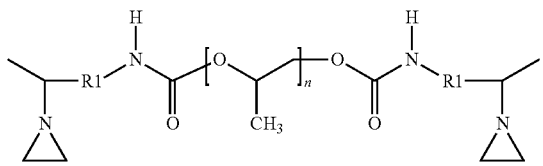

° C. was 4.5 Pa·seconds. This polymer may be obtained as A-PREGON-8 aziridino-functional polyether from 3M Company.

A variety of thermally conductive fillers were investigated, alone and in combination. These fillers are summarized in Table 1.

TABLE 1

Thermally conductive fillers (TCF).

| TCF | Chemistry | Surface-treated | Tradename (Source) |
|---|---|---|---|
| A | aluminum oxide | yes | MARTOXID TM 2250 (Huber-Martinswerke) |
| B | aluminum trihydrate | yes | APYRAL 2E (Nabaltec) |
| C | aluminum oxide | yes | SILATHERM PLUS 1443-024 SST (Quarzwerke) |
| D | aluminum silicate | yes | SILATHERM 1360-506 SST (Quarzwerke) |
| E | aluminum oxide (spherical) | yes | A-Sample 212 (Showa Denko) |
| F | boron nitride | no | BN-Cooling Filler Flakes 70/500 (3M Company) |
| G | graphite | no | GraphTherm 23/99.9 (G. Luh GmbH) |

The following samples were prepared as two-part formulations. Part A is the initiator formulation. Part B contained the aziridino-functional polyether polymer and the thermally conductive fillers.

Part A was prepared by combining 18 grams of p-Toluene sulfonic acid Monohydrate; 11 grams of water, and 40.5 grams of polypropylenglycol (ACCLAIM 4200, from Covestro with a reported molecular weight of 4000 grams per mole). This solution was mixed for 20 minutes at room temperature and then heated to 60° C. While stirring at 60° C., the filler (24.5 grams of fused silica (3M™ Fused Silica 20, from 3M Company) and zinc oxide (6 grams) were added in two steps. First, half of the filler was added and the solution was stirred for ten minutes. Next, the zinc oxide and the remaining half of the filler were added, and composition was stirred for an additional five minutes. The final solution was allowed to cool to room temperature while stirring, resulting in zinc tosylate initiator in a paste containing the water, polypropylenglycol, and filler Part B for Examples EX-1 to EX-12 was prepared by mixing together 15 grams of the first aziridino-functional polyether polymer (AZ-PE-1) with 5 grams of plasticizer (a low molecular weight, cyclic, polyether), and various thermally-conductive fillers as listed in Table 2.

TABLE 2

Summary of Part B compositions prepared with the AZ-PE -1 polyether.

| | Filler 1 | | | Filler 2 | | | Filler total |
|---|---|---|---|---|---|---|---|
| Ex. | TCF | grams | vol. % | TCF | grams | vol. % | vol% |
| EX-1 | A | 80 | 44 | — | — | — | 44 |
| EX-2 | C | 80 | 44 | — | — | — | 44 |
| EX-3 | C | 95 | 47 | — | — | — | 47 |
| EX-4 | A | 60 | 30 | F | 20 | 18 | 48 |
| EX-5 | A | 30 | 19 | G | 20 | 22 | 41 |
| EX-6 | A | 20 | 13 | G | 24 | 27 | 40 |
| EX-7 | C | 30 | 19 | G | 20 | 22 | 41 |
| EX-8 | E | 80 | 44 | — | — | — | 44 |
| EX-9 | E | 110 | 50 | — | — | — | 50 |
| EX-10 | E | 40 | 23 | F | 20 | 20 | 43 |
| EX-11 | F | 25 | 33 | — | — | — | 33 |
| EX-12 | B | 55 | 48.5 | — | — | — | 48.5 |

For each example, cured samples were prepared by adding 7.5 g of Part A (the initiator paste) to Part B. The composition was mixed then coated between two release liners with a knife coater to a thickness of one millimeter (mm) and cured at room temperature. Curing was complete in about 5 to 10 minutes. However, the samples were allowed to dwell overnight prior to testing.

Part B of Examples EX-13 to EX-20 were prepared by combining 20 grams of the second aziridino-functional polyether polymer (AZ-PE-2) and various thermally-conductive fillers as listed in Table 3.

TABLE 3

Summary of Part B compositions prepared with the AZ-PE-2 polyether.

| Ex. | TCF | grams | vol. % |
|---|---|---|---|
| EX-13 | A | 80 | 44 |
| EX-14 | A | 110 | 50 |
| EX-15 | C | 80 | 44 |
| EX-16 | C | 110 | 50 |
| EX-17 | C | 140 | 55 |
| EX-18 | E | 80 | 44 |
| EX-19 | E | 240 | 63 |
| EX-20 | E | 240 | 63 |

For each example, cured samples were prepared by adding 7.5 g of Part A (the initiator paste) to Part B. The composition was mixed then coated between two release liners with a knife coater to a thickness of one millimeter (mm) and cured at room temperature. Curing was complete in about 5 to 10 minutes. However, the samples were allowed to dwell overnight prior to testing.

Part B of Examples EX-21 and EX-22 were prepared by combining 20 grams of the third aziridino-functional polyether polymer (AZ-PE-3) with thermally-conductive filler TCF-E. EX-21 contained 180 grams (59 volume %) of TCF-E. EX-22 contained 240 grams (63 volume percent) of TCF-E.

For each example, cured samples were prepared by adding 7.5 g of Part A (the initiator paste) to Part B. The composition was mixed then coated between two release liners with a knife coater to a thickness of one millimeter (mm) and cured at room temperature. Curing was complete in about 5 to 10 minutes. However, the samples were allowed to dwell overnight prior to testing.

Thermal Conductivity Test. Samples 10 mm by 10 mm were cut from the cured films. The thermal diffusivity (a) of the cured samples was measured in square millimeters per second according to ASTM E1461/DIN EN 821 (2013) on a Netzsch-LFA HyperFlash device (Netzsch, Selb, Germany). The thermal capacity (Cp) was calculated in Joules per gram per Kelvin using the Netzsch-LFA HyperFlash in combination with a standard sample (Polyceram). The density (d) was determined in grams per cubic centimeter based on the weight and geometric dimensions of the sample. Using these parameters, the thermal conductivity (L) was calculated in Watts per meter·Kelvin according to L=a·d·Cp.

Hardness Test. The samples were tested according to ASTM D2240 (2015) with a durometer Type A. The sample size was at least 10 mm by 10 mm with a thickness of 6 mm. The load on the indentor was 12.5 N.

The samples were tested according to the Hardness Test and the Thermal Conductivity Test. The results are reported in Table 4.

TABLE 4

Test results.

| Ex. | L (W/m · K) | Shore A Hardness |
|---|---|---|
| AZ-PE-1 | | |
| EX-1 | 0.9 | 78 |
| EX-2 | 0.8 | 57 |
| EX-3 | 0.9 | N/A |
| EX-4 | 1.4 | 80 |
| EX-5 | 1.1 | 76 |
| EX-6 | 1.2 | 65 |
| EX-7 | 1.1 | 77 |
| EX-8 | 0.9 | 58 |
| EX-9 | 1.2 | 64 |
| EX-10 | 1.6 | 78 |
| EX-11 | 1.2 | N/A |
| EX-12 | 0.8 | 67 |
| AZ-PE-2 | | |
| EX-13 | 1.1 | 84 |
| EX-14 | 1.2 | 88 |
| EX-15 | 0.8 | 62 |
| EX-16 | 1.1 | 62 |
| EX-17 | 1.4 | 71 |
| EX-18 | 0.9 | 58 |
| EX-19 | 2.3 | N/A |
| EX-20 | 2.6 | 82 |
| AZ-PE-3 | | |
| EX-21 | 2.0 | 59 |
| EX-22 | 2.8 | 69 |
| EX-22* | 2.6 | |

N/A - sample hardness was not measured
*the thermal conductivity of EX-22 was measured twice Flame Retardancy Test Procedure The following materials were used to prepare samples for measurement of flame retardancy.

The samples were tested using UL 94, the Standard for Safety of Flammability of Plastic Materials for Parts in Devices and Appliances testing.

UL 94 is a plastics flammability standard released by Underwriters Laboratories of the United States. The standard determines the material's tendency to either extinguish or spread the flame once the specimen has been ignited. UL-94 is now harmonized with IEC 60707, 60695-11-10 and 60695-11-20 and ISO 9772 and 9773.

Samples of approximately 12 cm square by 1.25 cm thick samples were subject to a 2 cm, 50W tirrel burner flame ignition source. The test samples were placed horizontally above the flame with the test flame impinging on the bottom of the sample. For each sample, the time to extinguish were measured and V ratings were assigned. V ratings are a measure of time to extinguish along with the sample not burning to the top clamp or dripping molten material which would ignite a cotton indicator.

The UL 94 standard provides the following classification:

TABLE 5

UL94 classification

| | UL 94 classification | | |
|---|---|---|---|
| | V-0 | V-1 | V-2 |
| | Duration | | |
| | t [s] | t [s] | t [s] |
| Burning stops within | 10 | 30 | 30 |
| Drips of burning material allowed (ignites cotton ball) | No | No | Yes |
| Total burn of of sample | No | No | No |

Phosphorous and Expandable Graphite

A prescreening showed, that phosphorous compounds as well as expandable graphite by itself had only a limited effect on the flame retardancy of the thermally conductive gap filler materials described herein. Initially indicated favorable effect was found in a combination of the two fillers. Therefore a design of experiment study was performed using Exolit RP 6500 (red phosphorous) as well as Exolit OP 550 (white phosphorous) each in combination with expandable graphite in order to explore the effect of various concentration combinations.

Figure 4:
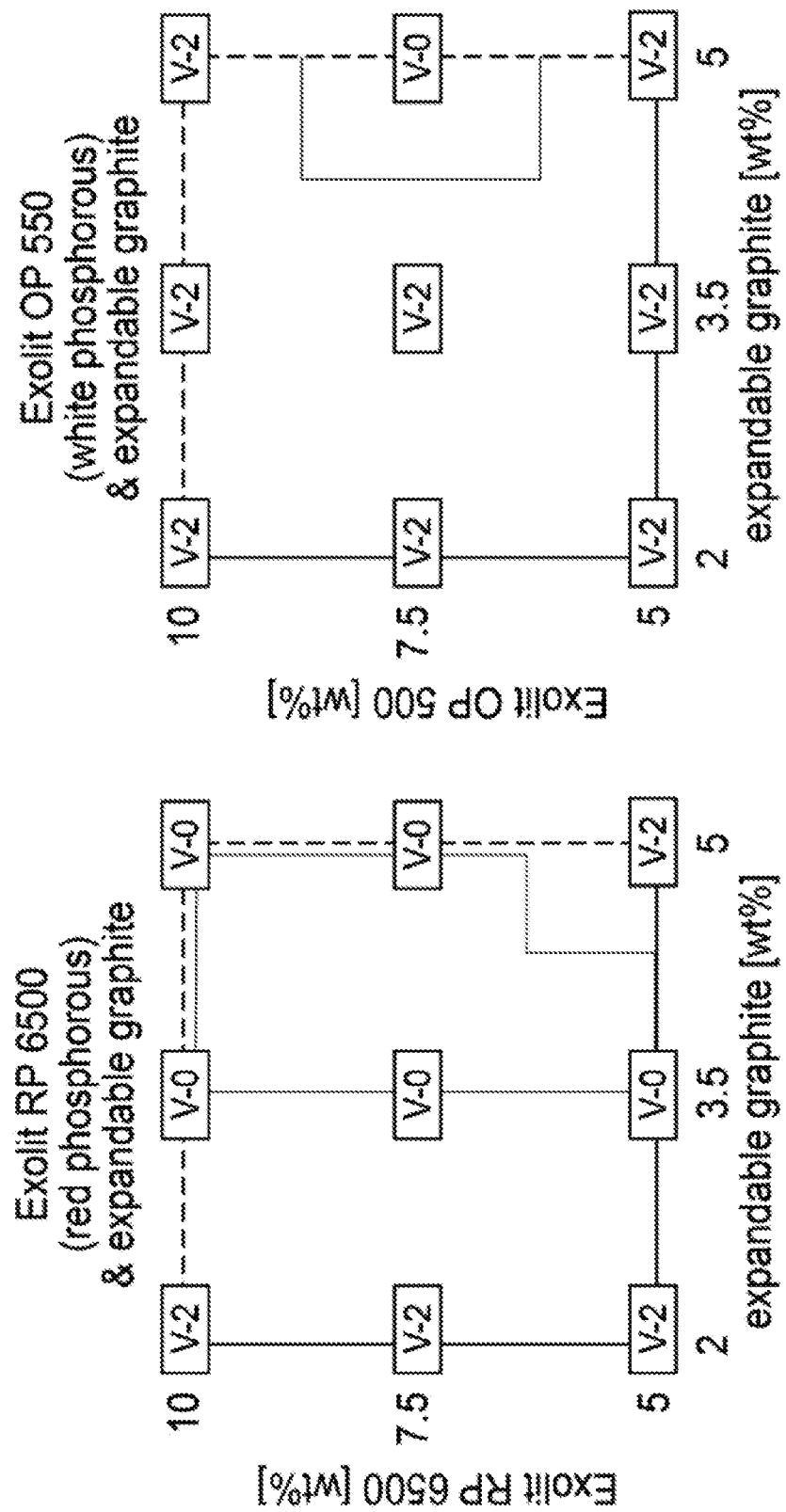
FIG. 4 illustrates UL-94 ratings for Exolit RP 6500 (red phosphorous) as well as Exolit OP 550 (white phosphorous) in combinations with expandable graphite.

Exolit RP6500 in combination with expandable graphite was an efficient filler package. In particular, 3.5 wt % of expandable graphite in combination with 5 wt % Exolit RP 6500 were sufficient to achieve a UL-94 rating of V0. For Exolit OP 500 5 wt % expandable graphite and 7.5 wt % Exolit OP500 also achieved a UL-94 rating of V0. The results are shown FIG. 4.

ATH Containing Samples

Samples were prepared using aluminium hydroxide and polyether based polymers for thermal gap filler. Upon UL-94 testing, a rating of V0 was achieved with an amount of 66 wt % of aluminium hydroxide (ATH). Further, the achieved thermal conductivity was 0.8 W/mK. The samples are listed in the table below.

TABLE 7

ATH containing samples.

| | Matrix | ATH | | λ |
|---|---|---|---|---|
| Example | % w/w | Material ID | % w/w | W m$^{-1}$ K$^{-1}$ |
| EX-13 | 26.6 | Apyral 2E | 66.5 | 0.80 |
| EX-14 | 26.6 | Martinal ON 921 | 66.5 | 0.79 |

Combining the results from the flame retardancy studies, the investigators prepared a number of samples toward the goal of minimizing the amount of flame retardant added (while still achieving acceptable UL-94 ratings) and maximizing the use of thermally conductive fillers like alumina or boron nitride (to increase the overall thermal conductivity of the compositions).

Secondary considerations include the ability to easily handle and incorporate Exolit OP 550, since it is a liquid. Further, ATH offers the advantage of being a thermally conductive filler as well as a flame retardant. Finding an advantageous combination of thermally conductive filler and flame retardant package for the use with the aziridino-functional polymer containing systems of the thermally-conductive gap filler materials described herein is an important development goal. As shown in the following table, all samples explored achieved a UL-94 rating of V0. Also reported are their measured thermal conductivities.

TABLE 8

Thermal conductivity for samples showing UL-94 rating of V0.

| Sample | Matrix % w/w | Al$_2$O$_3$ % w/w | BN % w/w | Exolit % w/w | ATH % w/w | BG % w/w | λ W m$^{-1}$K$^{-1}$ |
|---|---|---|---|---|---|---|---|
| 15 | 37.5 | 34.3 | 5.7 | 10.0 | 0.0 | 5.0 | — |
| 16 | 27.5 | 42.9 | 7.1 | 10.0 | 0.0 | 5.0 | — |
| 17 | 20.0 | 57.9 | 9.6 | 0.0 | 0.0 | 5.0 | 1.33 |
| 18 | 22.5 | 32.1 | 5.4 | 0.0 | 32.5 | 0.0 | 0.95 |
| 19 | 22.5 | 55.0 | 0.0 | 10.0 | 0.0 | 5.0 | 0.56 |
| 20 | 22.5 | 0.0 | 0.0 | 5.0 | 65.0 | 0.0 | 0.81 |
| 21 | 22.5 | 0.0 | 0.0 | 10.0 | 60.0 | 0.0 | 0.67 |
| 22 | 22.5 | 0.0 | 0.0 | 15.0 | 55.0 | 0.0 | 0.62 |
| 23 | 22.5 | 0.0 | 0.0 | 10.0 | 55.0 | 5.0 | 0.73 |
| 24 | 22.5 | 55.0 | 0.0 | 7.5 | 7.5 | 0.0 | 0.61 |
| 25 | 22.5 | 55.0 | 0.0 | 10.0 | 5.0 | 0.0 | 0.53 |
| 26 | 22.5 | 55.0 | 0.0 | 5.0 | 5.0 | 5.0 | 0.67 |
| 27 | 22.5 | 0.0 | 0.0 | 5.0 | 70.0 | 0.0 | 0.74 |
| 28 | 22.5 | 0.0 | 0.0 | 5.0 | 65.0 | 0.0 | 0.81 |
| 29 | 22.5 | 0.0 | 0.0 | 10.0 | 60.0 | 0.0 | 0.72 |
| 30 | 22.5 | 0.0 | 0.0 | 15.0 | 55.0 | 0.0 | 0.61 |
| 31 | 22.5 | 0.0 | 0.0 | 10.0 | 55.0 | 5.0 | 0.67 |
| 32 | 22.5 | 0.0 | 0.0 | 5.0 | 65.0 | 0.0 | 0.68 |
| 33 | 22.5 | 0.0 | 0.0 | 15.0 | 55.0 | 0.0 | 0.37 |
| 34 | 22.5 | 0.0 | 0.0 | 10.0 | 55.0 | 5.0 | 0.55 |
| 35 | 22.5 | 0.0 | 0.0 | 5.0 | 65.0 | 0.0 | 0.69 |
| 36 | 22.5 | 0.0 | 0.0 | 10.0 | 55.0 | 5.0 | 0.55 |

Various modifications and alterations of this invention will become apparent to those skilled in the art without departing from the scope and spirit of this invention.

What is claimed is:

1. A thermally-conductive gap filler comprising an aziridino-functional polyether polymer and at least 30% by volume of a thermally-conductive filler based on the total volume of the gap filler.

2. The thermally-conductive gap filler of claim 1, wherein at least one polyether polymer has the formula:

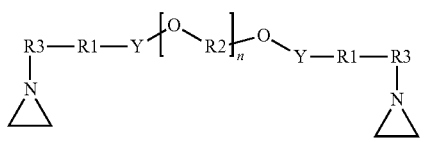

wherein: R1 is a covalent bond or an alkylene group;
each R2 is independently selected from the group consisting of alkylene groups;
R3 is a straight chain or branched alkylene groups;
Y is a divalent linking group;
and n is an integer selected such that the calculated molecular weight of the polyether polymer is greater than 2000 grams per mole.

3. The thermally-conductive gap filler of claim 2, wherein the at least one polyether polymer has the formula:

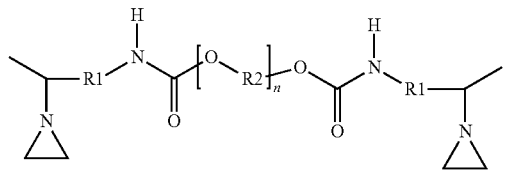

wherein: R1 is an alkylene group;
each R2 is independently selected from the group consisting of alkylene groups having 2 to 6 carbon atoms; and
n is an integer selected such that the calculated molecular weight of the polyether polymer is between 2000 and 10,000 grams per mole.

4. The thermally-conductive gap filler of claim 3, wherein the at least one polyether polymer has the formula:

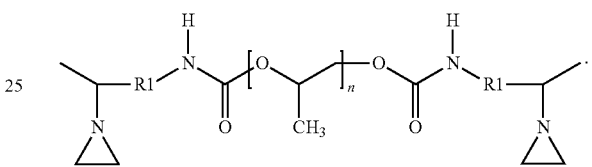

5. The thermally-conductive gap filler of claim 2, wherein R1 is an alkylene group having two carbon atoms.

6. The thermally-conductive gap filler of claim 2, wherein each R2 is independently selected from the group consisting of linear alkylene groups having 2 to 6 carbon atoms.

7. The thermally-conductive gap filler of claim 6, wherein the at least one polyether polymer is a random copolymer wherein the R2 groups consist of linear alkylene groups have two carbon atoms and four carbon atoms, and having the formula:

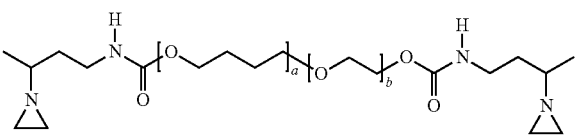

wherein a and b are integers greater than or equal to 1, and the sum of a and b is equal to n.

8. The thermally-conductive gap filler of claim 2, wherein n is selected such that the calculated molecular weight of the at least one polyether polymer is no greater than 10,000 grams/mole.

9. The thermally-conductive gap filler of claim 1, wherein the gap filler comprises at least 50% by volume of a thermally-conductive filler based on the total volume of the gap filler.

10. The thermally-conductive gap filler of claim 1, wherein the thermally conductive filler is selected from the groups consisting of ceramics, metals, graphite, and combinations thereof.

11. The thermally-conductive gap filler of claim 1, further comprising an initiator.

12. The thermally-conductive gap filler of claim 11, wherein the initiator has the formula:

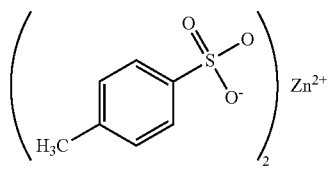

13. The thermally-conductive gap filler of claim 1, further comprising at least one of a plasticizer and a flame retardant.

14. The thermally-conductive gap filler of claim 1, comprising a flame retardant selected from the group consisting of an intumescent material, an aluminum hydroxide, and combinations thereof.

15. The thermally-conductive gap filler according to claim 14, further wherein the intumescent material is selected from the group consisting of phosphorous and expandable graphite.

16. The thermally-conductive gap filler according to claim 15, further wherein the phosphorous is selected from red phosphorous and white phosphorous.

17. A battery module comprising a plurality of battery cells connected to a first base plate by a first layer of a first thermally-conductive gap filler of claim 1.

18. The battery module of claim 17, wherein the aziridino groups have been reacted to cure the first thermally-conductive gap filler.

19. A battery subunit comprising a plurality of battery modules connected to a second base plate by a second layer of a second thermally-conductive gap filler, wherein each battery module comprising a plurality of battery cells connected to a first base plate by a first layer of a first thermally-conductive gap filler, wherein the first thermally-conductive gap filler and the second thermally conductive gap filler are independently selected, and each is a thermally-conductive gap filler of claim 1.

20. A method of making a battery module comprising: applying a first layer of a first thermally-conductive gap filler of claim 1 to a first surface of a first base plate, attaching a plurality of battery cells to the first layer to connect the battery cells to the first base plate, and curing the first thermally-conducting gap filler.

\* \* \* \* \*